United States Patent Office 3,817,917
Patented June 18, 1974

3,817,917
ORGANO-ELEMENT POLYSILOXANES HAVING SPIROCYCLIC STRUCTURE OF MOLECULES AND METHOD OF PRODUCING THE SAME
Kuzma Andrianovich Andrianov, Vystavochny pereulok 3, kv. 9, and Marina Alexandrovna Sipyagina, ulitsa Kramskogo 3, kv. 1, both of Moscow, U.S.S.R.
No Drawing. Filed July 28, 1971, Ser. No. 166,690
Int. Cl. C08f 11/04
U.S. Cl. 260—46.5 R    4 Claims

ABSTRACT OF THE DISCLOSURE

Organo-element polysiloxanes having spirocyclic structure of molecules of the general formula,

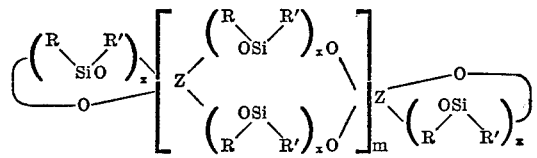

wherein Z represents Si or Ti; R and R' represent $CH_3$ or $C_6H_5$; $x=1-8$; $m=3-30$. A method of producing said organo-element polysiloxanes is disclosed comprising reacting tetrafunctional monomers of the general formula, $ZY_4$, wherein Z represents Si or Ti; Y represents Cl or $OC_nH_{2n+1}$ with $n=1-4$, with bifunctional oligomers of the general formula,

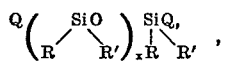

wherein R and R' represent $CH_3$ or $C_6H_5$; Q represents OH or OM, where M is an alkali metal; $x=0-4$, in organic solvents at $-10°$ to $+25°$ C. at a molar ratio between said tetrafunctional monomers and bifunctional oligomers of 1:2 respectively. Alternatively, these tetrafunctional monomers may be reacted with tetrafunctional cross-oligomers of the general formula

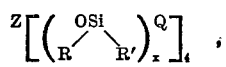

wherein Z, R, R', Q have the above-mentioned significance and $x=1-4$, in organic solvents at $-10°$ to $+25°$ C. at a molar ratio between said monomers and oligomers of 1:1, or polycondensation may be effected of tetrafunctional cross-conformation oligomers of the general formula

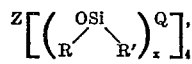

where Z, R, R', $x$ have the above-mentioned signficance; Q represents OH at 100–180° C. The polymers according to the invention may be used as film-forming materials, binding agents for glass fiber plastics and structuring agents in the production of elastomers.

The present invention relates to organo-element polysiloxanes having a spirocyclic structure of molecules and to a method of producing the same.

Said polymers may be used as film-forming materials, binding agents for fiber glass plastics and structuring agents in the production of elastomers.

Organo-element polysiloxanes having a spirocyclic structure of molecules are not known.

It is an object of the present invention to widen the range of organo-element polysiloxanes.

In accordance with this and other objects there are provided according to the present invention, organo-element polysiloxanes having spirocyclic structure of molecules of the general formula

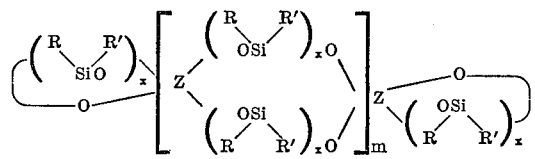

wherein Z represents Si or Ti; R and R' represent $CH_3$ or $C_6H_5$; $x=1-8$; $m=3-30$.

Organo-element polysiloxanes having a spirocyclic structure of molecules, due to specific structure of molecular chains exhibit interesting technical properties inherent to compounds of this class, namely, the ability of changing their structure under heating with the formation of polymers having cross-linked structure. This transition may occur either spontaneously or in the presence of diverse catalysts accelerating opening of the ring. It is this feature of spirocyclic oligomers which constitutes a prerequisite for their use as a film forming material and binding agent for glass fiber plastics. Furthermore, spirocyclic oligomers may be used in the production of elastomers by introducing them into linear polymers having flexible molecular chains. In this case they function as structuring agents.

Organo-element polysiloxanes having spirocyclic structure of molecules according to the invention may be produced by a method comprising reacting tetrafunctional monomers of the general formula $ZY_4$, wherein Z represents Si or Ti; Y represents Cl or $OC_nH_{2n+1}$ with $n=1-4$, with bifunctional oligomers of the general formula

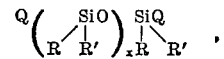

wherein Q represents OH, OM, where M is an alkali metal; R and R' represent $CH_3$ or $C_6H_5$; $x=0-4$, in organic solvents at $-10°$ to $+25°$ C. at a molar ratio between said tetrafunctional monomers and bifunctional oligomers of 1:2 respectively, or reacting said tetrafunctional monomers with tetrafunctional cross-oligomers of the general formula,

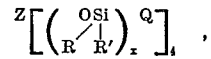

wherein Z, R, R', Q, have the above-mentioned significance and $x=1-4$, in organic solvents at $-10°$ to $+25°$ C. at a molar ratio between said monomers and oligomers of 1:1, or effecting polycondensation of tetrafunctional cross-conformation oligomers of the general formula

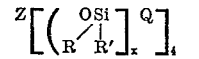

wherein Z, R, R', $x$ have the above-mentioned significance, while Q represents OH, at 100–180° C.

Organo-element polysiloxanes having a spirocyclic structure according to the invention are produced in the following manner:

Bifunctional oligomer of the general formula

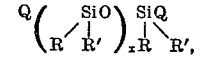

wherein Q represents OM or where M is an alkali metal; R and R' represent $CH_3$ or $CH_6H_5$; $x=0-4$, is placed into a reactor provided with a stirrer and a cooling system and containing an organic solvent such as diethyl ether, benzene, or toluene. A solution of tetrafunctional monomer of the general formula $ZY_4$, wherein Z represents Si or Ti; Y represents Cl, in a similar organic solvent is then added into the reactor under stirring. During the reaction a temperature is maintained at a level of from −10° to +25° C. After a total amount of $ZY_4$ has been added into the reaction mass, said mass is stirred at 20–25° C. for 2 hours. A precipitate which is thus formed is filtered off, the solvent being removed under vacuum.

Where diorganosiloxane diols are used as bifunctional oligomers, two solutions are simultaneously introduced under intensive stirring into a reaction vessel containing an organic solvent, the first consisting of a solvent and $ZY_4$ (wherein Z is Si, Ti; Y is Cl), the second consisting of an acceptor of hydrogen chloride, diorganosiloxane diol and an organic solvent. The both solutions are introduced at the same rate. During the reaction the temperature is maintained at a level of from −10° to +25° C. A precipitate of amine chlorohydrate which is thus formed is filtered off, the solution is washed with water to remove the amine traces, and the solvent is then removed under vacuum.

$ZY_4$ is used as tetrafunctional monomer, wherein Y is $OC_nH_{2n+1}$ (n=1–4), and said monomer is reacted with bifunctional oligomer

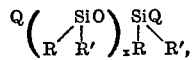

wherein R and R' represent $CH_3$ or $C_6H_5$; Q represents OH; x=0–4, the order of the introduction of components and conditions of the reaction are the same as in the case of reaction between oligomer

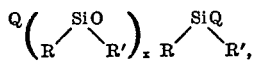

wherein Q represents OM (M is an alkali metal); R and R' represent $CH_3$ or $C_6H_5$; x=0–4, and monomer $ZY_4$, wherein Z represents Si or Ti; Y represents Cl, except for differencies in a further stage of the process. After all the components have been introduced into the reaction mixture, the mixture is allowed to stay at 40° C. under vacuum, and then is allowed to stay at 12° C. also under vacuum until complete elimination of traces of an alcohol formed during the reaction.

Where tetrafunctional monomers $ZY_4$, wherein Y is Cl; Z is Si or Ti, are used as the starting component together with tetrafunctional cross-oligomers of the general formula

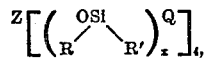

wherein Z, R, R', have the above-mentioned significance x=1–4, and Q represents OM (M is an alkali metal), the process of producing spirocyclic polysiloxane oligomers is similar to the case where as starting products are used bifunctional oligomers

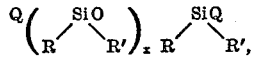

wherein Q represents OM (M is an alkali metal), R and R' represent $CH_3$ or $C_6H_5$; x=0–4, and tetrafunctional monomers $ZY_4$ wherein Z represents Si or Ti; Y represents Cl.

Where tetrafunctional cross-oligomers

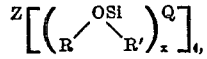

wherein Q represents OH; R and R' represent $CH_3$ or $C_6H_5$; x=1–4, and tetrafunctional monomer $ZY_4$, wherein Z represents Si, Ti; Y represents $OC_nH_{2+1}$ (n=1–4), are used as starting components, the reaction is effected similarly to the case of reacting bifunctional oligomers of the general formula

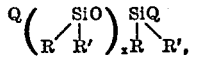

wherein Q represents OH; R and R' represent $CH_3$ or $C_6H_5$; x=0–4, with tetrafunctional monomers $ZY_4$, wherein Z represents Si or Ti; Y represents $OC_nH_{2n+1}$ (n=1–4).

In reacting tetrafunctional cross-oligomer of the general formula

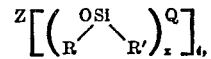

wherein Q represents OH; R and R' represent $CH_3$ or $C_6H_5$; x=1–4, with tetrafunctional monomer $ZY_4$, wherein Z represents Si or Ti; Y represents Cl, the reaction takes place similarly to the case, where bifunctional oligomer of the general formula,

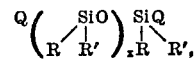

wherein R and R' represent $CH_3$ or $C_6H_5$; Q represents OH; x=0–4, are reacted with the same tetrafunctional monomers.

Polyspirocyclic oligomers may also be produced by means of polycondensation in a block of tetrafunctional cross-conformation oligomers of the general formula,

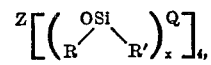

wherein Q represents OH; R and R' represent $CH_3$ or $C_6H_5$; Z represents Si or Ti; x=1–4.

In this case dry nitrogen is blown through the system being condensed. The process is performed at 100–180° C. during 20–5 hours.

Prior to analyzing the structure and composition of the organo-element polysiloxanes having spirocyclic structure of molecules thus obtained, they were reprecipitated from organic solvents such as diethyl ether, benzene, toluene, using hexamethyldisiloxane as a precipitating agent.

Composition of the organo-element polysiloxanes having spirocyclic structure of molecules thus obtained has been confirmed by the data of elementary analysis and molecular weight, their conformation being supported by the data obtained in studying IR spectra and the results of X-ray structural analysis.

The IR spectra of organo-element polysiloxanes having spirocyclic structure of molecules are characterized by the same features as in the case of spirocyclic monomer compounds, namely, the features connected with variations of

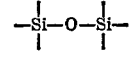

groups adjacent to the central atom and constituting the structure nucleus therewith. In this case splitting of asymmetric valence variations and shifting of symmetric valence variations of

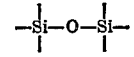

bonds may be observed.

In addition, molecular packing of the organo-element polysiloxanes having spirocyclic structure is characterized by an interplanar distance d of about 4.4–4.6 A. indicating the presence of the group

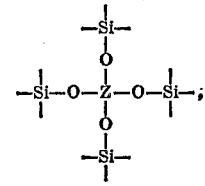

wherein Z represents Si or Ti.

The invention will be better understood from the following examples of the production of organo-element polysiloxanes having a spirocyclic structure of molecules.

EXAMPLE 1

A solution of 58 g. of 1,5-disodium-oxy-1,3,5-trimethyl-1,3,5-triphenyltrioxane in 100 ml. of benzene was poured into a reaction vessel. A solution of 10.4 g. of silicon tetrachloride in 75 ml. of benzene was then introduced into this solution under intensive stirring and cooling to +10° C. After the total amount of silicon tetrachloride had been introduced, the cooling was stopped, and the contents of the reaction vessel were stirred for two hours with resulting temperature increase up to 20–25° C. Subsequently sodium chloride precipitate was separated under vacuum. 32.34 g. of the product were obtained (59.0% of theoretical yield) having the vitrification temperature of −36° C., mol. wt. 3,500, which contained (in percent) Si, 22.30; C, 57.23; H, 5.73; Na—none, Cl—none. For $(Si_7O_8C_{42}H_{48})$ it has been calculated (in percent): Si, 22.41; C, 57.49; H, 5.51. Mol. wt. (877)·m.

EXAMPLE 2

By reacting 58 g. of 1,5-dipotassiumoxy-1,3,5-trimethyl-1,3,5-triphenyltrisiloxane and 11.62 g. of titanium tetrachloride under conditions similar to that of Example 1 33.0 g. of a product (60% of theoretical yield) having the vitrification temperature of −30° C., mol. wt. 4,500 was obtained which contained (in percent) Ti, 5.68; Si, 18.81; C, 56.28; H, 5.53, Na—none, Cl'—none. For $(Ti_1Si_6O_8C_{42}H_{48})_m$ it has been calculate (in percent): Ti, 5.33; Si, 18.78; C, 56.22; H, 5.39. Mol. wt. (897)·m.

EXAMPLE 3

50 ml. of dry diethyl ether and 0.1 g. of pyridine were poured into a reaction vessel provided with a stirrer, two burettes and a reflux condenser. The reaction vessel was chilled to −10° C., whereafter the chilling was stopped, and solutions I and II were added into the vessel during 5 minutes under intensive stirring.

The solution I contained 1.76 g. of silicon tetrachloride in diethyl ether, while the solution II contained 6.00 g. of 1,3 - dihydroxy-1,3-dimethyl-1,3-diphenyldisiloxane and 3.27 g. of pyridine in benzene. The solutions I and II were prepared in such a way that the final volume of each would be 30 ml. The reactants were carefully protected from the action of atmospheric humidity.

After the introduction of the solutions I and II the temperature in the reaction vessel was raised to +25° C. and was maintained at this level for 1 hour under stirring. Then the stirring was stopped. The precipitate of pyridine hydrochloride which was thus formed was separated by means of a Shott's filter, the ether solution was washed to remove the traces of pyridine by testing with bromothymol blue, and dried with calcinated potash, while the solvent was removed under vacuum. 2.83 g. of the reaction product (42% of theoretical yield) were obtained, having the vitrification temperautre of −27° C., mol. wt. 18,000, which contained (in percent): Si, 23.59; C, 56.50; H, 5.30; OH—none, Cl'—none.

For $(Si_5O_6C_{28}H_{23})_m$ it has been calculated (in percent): Si, 23.20, C, 55.60, H, 5.29, mol. wt. (605)·m.

EXAMPLE 4

3.60 g. of diphenyldihydroxysilane dissolved in 120 ml. of dry diethyl ether were poured into a reaction vessel. 2.83 g. of tetrabutoxy titanium dissolved in dry diethyl ether were then slowly added dropwise at 25° C. Then the mixture was heated under vacuum (residual pressure of 2 mm. Hg) at 40° C. for 5 hours and at 120° C. for another 3 hours to remove butyl alcohol and the solvent. 2.46 g. of the desired product (62% of theoretical yield) were obtained, which contained (in percent): Ti, 10.98; Si, 11.00; C, 59.91; H, 4.63; OH—none, mol. wt. 3,800. For $(Ti_1Si_2O_4C_{24}H_{20})_m$ it has been calculated (in percent): Ti, 10.05; Si, 11.79; C, 60.49; H, 4.23. Mol. wt. (352)·m.

EXAMPLE 5

A solution of 107 g. of tetrakis-(3,5,7-trimethyl-3,5,7-triphenyltrisiloxane-7-hydroxy)titanium in 200 ml. of dry diethyl ether was poured into a reaction vessel. 20.8 g. of tetrabutoxytitanium in 50 ml. of absolute diethyl ether were added into the vessel at +15° C. under intensive stirring. The mixture thus produced was heated under vacuum (residual pressure of 1 mm. Hg) up to 40° C. and allowed to stay at this temperature for 10 hours, butyl alcohol and the solvent being distilled off. 70.81 g. (64.47% of theoretical yield) of the product was obtained, having the vitrification temperature of −30° C., mol. wt. 5,300, the product containing (in percent): Ti, 5.70; Si, 18.64; C, 56.40; H, 5.30; OH—none. For $(Ti_1Si_6O_8C_{42}H_{48})_m$ it has been calculated (in percent): Ti, 5.33; Si, 18.78; C, 56.22; H, 5.39. Mol. wt. (897)·m.

EXAMPLE 6

50 ml. of dry benzene were poured into a reaction vessel provided with a stirrer, two burettes and a reflux condenser. The reaction vessel was chilled to +5° C. Then solutions I and II were simultaneously added from the two burettes into the reaction vessel at a same rate under intensive stirring.

The solution I contained 112.5 g. of tetrakis-(3,5,7-trimethyl - 3,5,7 - triphenyltrisiloxane)titanium in benzene. The solution II contained 11.61 g. of titanium tetrachloride in benzene. After the solutions have been introduced into the reaction vessel, the chilling was stopped, and the temperature of the reaction mixture was raised to +25° C. The mass was stirred at the above-mentioned temperature for 1.5 hours. Then a precipitate of sodium chloride was separated by means of a Shott's filter, and benzene was removed under vacuum. 69 g. of the product (62.9% of theoretical yield) was produced, having the vitrification temperature of −31° C., mol. wt. 4,300, the product containing (in percent): Ti, 5.70; Si, 18.94; C, 56.50; H, 5.50; Na—none. For $(Ti_1Si_6O_8H_{48})_m$ it has been calculated (in percent): Ti, 5.33; Si, 18.78; C, 56.22; H, 5.39. Mol. wt. (897)·m.

EXAMPLE 7

3.0 g. of tetrakis-(3,5-dimethyl-3,5-diphenyldisiloxane-3-hydroxy)silane were poured into a reaction vessel. The system was blown with dry nitrogen at +20° C. for 30 minutes, the gas supply rate being 18–20 ml. per minute. Then the reaction vessel was placed into a thermostat at +100° C. and was allowed to stay at this temperature at a same rate of the gas supply for 20 hours, the amount of water released during the reaction being periodically determined. A calculated amount of water was released in 15 hours, and a colourless viscous liquid readily soluble in organic solvents was produced which contained no hydrolysis.

Polyspirocyclic oligomers were produced having the vitrification temperature of −21° C., mol. wt. up to 4,000. The yield of the reaction products was 2.14 g. (75% of theoretical yield).

EXAMPLE 8

Following the procedure of Example 7 and using 3.0 g. of tetrakis - (3,5,7 - trimethyl - 3,5,7 - triphenylsiloxano-7-hydroxy)titanium at the temperature of 180° C. in 5 hours 2.07 g. (70% of theoretical yield) of the condensation product were obtained, which contained no hydroxyls and comprised polyspirocyclic oligomers, having the vitrification temperature of −37° C. and the intrinsic viscosity of 0.2.

EXAMPLE 9

Following the procedure of Example 7 and using 3.0 g. of tetrakis - (3,5,7,9 - tetramethyl - 3,5,7,9 - tetraphenyltetrasiloxano-9-hydroxy)silane at the temperature of 150° C. in 10 hours, 1.95 g. (66.0% of theoretical yield) of the desired product were obtained, which contained no hydroxyls, having the vitrification temperature of −21° C. and mol. wt. of 4,520.

EXAMPLE 10

Following the procedure of Example 3 and using 10.0 g. of tetrakis - (3,5 - dimethyl - 3,5 - diphenyldisiloxano-5-hydroxy)silane and 1.43 g. of silicon tetrachloride at −7° C., 1.0 g. (9.7% of theoretical yield) of the desired product having the vitrification temperature of −20° C. and mol. wt. 6,000 were obtained, which contained (in percent): Si, 23.00; C, 56.5; H, 5.30; OH—none. For $(Si_5O_6C_{28}H_{32})_m$ it has been calculated (in percent): Si, 23.20; C, 55.60; H, 5.29. Mol. wt. (605)·m.

EXAMPLE 11

Following the procedure of Example 4 and using 4.0 g. of 1,3 - dihydroxy - 1,3 - dimethyl-1,3-diphenyldisiloxane and 1.57 g. of tetraethoxytitanium in benzene at +7° C., 2.1 g. (48.7% of theoretical yield) of the desired product having the vitrification temperature of −11° C. was obtained, which contained (in percent): Ti, 7.65; Si, 16.82; C, 52.26; H, 5.78; mol. wt. 5,182. For $(Ti_1Si_4O_6C_{28}H_{32})_m$ it has been calculated (in percent): Ti, 7.67; Si, 17.92; C, 53.80; H, 5.12. Mol. wt. (625)·m.

We claim:

1. An organo-element polysiloxane having a spirocyclic structure of the general formula

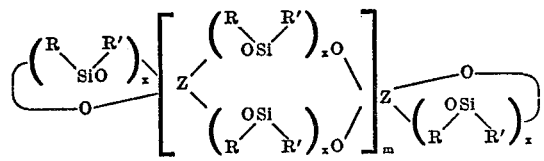

wherein Z represents Si or Ti; and R′ represent $CH_3$ or $C_6H_5$; $x=1-8$; $m=3-30$.

2. A method of producing an organo-element polysiloxane having a spirocyclic structure comprising reacting a tetrafunctional monomer of the general formula, $ZY_4$, wherein Z represents Si or Ti; Y represents Cl or $$OC_nH_{2n+1}$$

with $n=1-4$, with a bifunctional oligomer of the general formula

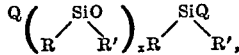

wherein Q represents OH or OM, where M is an alkali metal; R and R′ represent $CH_3$ or $C_6H_5$; $x=0-4$, in an organic solvent at a temperature of −10° to +25° C. at a molar ratio between said monomer and oligomer of 1:2 respectively.

3. A method of producing an organo-element polysiloxane having a spirocyclic structure, comprising reacting a tetrafunctional monomer of the general formula $ZY_4$, wherein Z represents Si or Ti; Y represents Cl or $$OC_nH_{2n+1}$$

with $n=1-4$, with a tetrafunctional cross-oligomer of the general formula

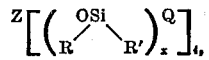

wherein Z represents Si or Ti; R and R′ represent $CH_3$ or $C_6H_5$; Q represents OH or OM, where M is an alkali metal; $x=1-4$, in an organic solvent at a temperature of −10° to +25° C. at a molar ratio between said monomer and oligomer of 1:1.

4. A method of producing an organo-element polysiloxane having a spirocyclic structure, comprising polycondensing tetrafunctional cross-oligomers of the general formula

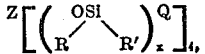

wherein Z represents Si or Ti; R and R′ represent $CH_3$ or $C_6H_5$; Q represents OH; $x=1-4$, at 100–180° C.

References Cited

UNITED STATES PATENTS

| | | | |
|---|---|---|---|
| 2,512,058 | 6/1950 | Gulledge | 260—46.5 |
| 2,843,555 | 7/1958 | Berridge | 260—18 |
| 3,383,355 | 5/1968 | Cooper | 260—46.5 |

MELVYN I. MARQUIS, Primary Examiner

U.S. Cl. X.R.

260—2 S, 46.5 E, 46.5 G, 448.2 N, 448.2 R